US 6,537,173 B2

(12) United States Patent
Mercat et al.

(10) Patent No.: US 6,537,173 B2
(45) Date of Patent: Mar. 25, 2003

(54) TRANSMISSION SYSTEM FOR A BICYCLE (75) Inventors: Jean-Pierre Mercat, Chatillon sur Chalaronne (FR); Bertrand Cauvin, Montmerle sur Saone (FR)

(73) Assignee: Mavic S.A., Saint Trivier sur Moignans (FR)

( * ) Notice: Subject to any disclaimer, the term of this patent is extended or adjusted under 35 U.S.C. 154(b) by 0 days.

(21) Appl. No.: 09/828,960

(22) Filed: Apr. 10, 2001

(65) Prior Publication Data

US 2002/0103052 A2 Aug. 1, 2002

(30) Foreign Application Priority Data

Apr. 11, 2000 (FR) .............................. 00 04791

(51) Int. Cl.$^7$ .................. F16H 37/02; B62D 61/02; B62K 11/00; B62M 7/00
(52) U.S. Cl. ............... 475/212; 475/213; 475/296; 475/302; 180/221; 180/231
(58) Field of Search ................ 475/212, 213, 475/295, 298, 302, 296; 474/78–81; 180/221, 231

(56) References Cited

U.S. PATENT DOCUMENTS

| 3,901,095 A | | 8/1975 | Wechsler ................ 74/217 B |
| 4,055,093 A | | 10/1977 | Ross ........................ 74/501 R |
| 4,261,223 A | * | 4/1981 | Johnson ........................ 74/393 |
| 4,279,174 A | | 7/1981 | Ross ........................ 74/473 P |
| 4,580,997 A | | 4/1986 | Browning et al. ............. 474/78 |
| 5,152,720 A | * | 10/1992 | Browning et al. ............. 474/80 |
| 5,205,794 A | | 4/1993 | Browning .................... 474/160 |
| 5,261,858 A | | 11/1993 | Browning ..................... 474/69 |
| 5,358,451 A | | 10/1994 | Lacombe et al. ............. 474/78 |
| 5,399,128 A | | 3/1995 | Nürnberger ................ 475/298 |
| 5,800,302 A | * | 9/1998 | Werre ........................ 475/1 |
| 5,803,848 A | | 9/1998 | Nier ............................ 474/81 |
| 5,865,062 A | | 2/1999 | Lahat ...................... 74/473.12 |
| 5,938,560 A | * | 8/1999 | Steuer ...................... 192/217.4 |
| 5,984,814 A | | 11/1999 | Davenport ................... 474/50 |
| 6,152,250 A | * | 11/2000 | Shu-Hsien ................. 180/220 |
| 6,176,798 B1 | * | 1/2001 | Nakamura .................. 474/160 |

FOREIGN PATENT DOCUMENTS

| EP | 0554874 | 8/1993 |
| EP | 0558425 | 9/1993 |
| EP | 0786400 | 7/1997 |
| EP | 0794114 | 9/1997 |
| EP | 0849155 | 6/1998 |
| FR | 961520 | 5/1950 |
| FR | 2750669 | 1/1998 |
| FR | 2798114 | 3/2001 |
| GB | 418716 | 10/1934 |
| GB | 449850 | 7/1936 |
| WO | WO96/25321 | 8/1996 |
| WO | WO 99/11515 | 3/1999 |

* cited by examiner

Primary Examiner—Sherry Estremsky
Assistant Examiner—Tisha D. Lewis
(74) Attorney, Agent, or Firm—Greenblum & Bernstein, P.L.C.

(57) ABSTRACT

A transmission system provided for a bicycle, including a primary transmission sub-assembly having a set of rear sprockets, whose number of teeth, from one sprocket to the next sprocket in the ascending order, varies according to a ratio of the numbers of teeth that is greater than or equal to a value n such as n greater than 1. The invention also includes a control of the transmission system, as well as a bicycle that includes the transmission system and the control for same. The transmission system includes a single chain wheel for driving the chain, associated with a bottom bracket assembly, and a secondary transmission sub-assembly having at least two drive output ratios, whose ratio of the highest drive speed to the lowest drive speed is equal to a value R between 1 and n so as to introduce at least one intermediate transmission ratio between two successive sprockets.

10 Claims, 10 Drawing Sheets

TRANSMISSION SYSTEM FOR A BICYCLE

BACKGROUND OF THE INVENTION

1. Field of the Invention

The present invention relates to a transmission system for a bicycle. It also relates to a device for controlling the transmission system, as well as to a bicycle equipped with the transmission system and control device.

2. Description of Background and Relevant Information

Usually, a bicycle is equipped with a transmission system including a transmission chain, a rear sprocket cassette, a set of two or three front chain wheels, and rear and front derailleurs to transfer the chain from one sprocket to another, from one chain wheel to another, respectively. Currently, the sprocket cassettes include up to ten sprockets.

For such a system, the range of transmission ratios between the bottom bracket assembly rotating speed and the wheel rotating speed extends between two extreme ratios, one of which corresponds to the largest chain wheel and the smallest sprocket, and the other corresponds to the smallest chain wheel and the largest sprocket.

There is a certain number of intermediate ratios between these two ratios, which depend on the number of sprockets and chain wheels.

During a ratio change control, the variation in the transmission ratio does not have the same amplitude, depending upon whether one changes a chain wheel or a sprocket. It is known that for the various chain wheels, the ratio ranges obtained by sweeping the entire sprocket cassette overlap. Such that out of the set of possible ratios, which is equal to the number of sprockets multiplied by the number of chain wheels, only a portion, approximately one half, is actually exploited, or actually useful. There are overlapping zones in the ratio ranges, i.e., the same ratio, or almost the same ratio can be obtained with two different combinations between the chain wheels and the sprockets. If a progressive variation in the transmission ratio is desired, a change of chain wheel must be accompanied by a change of one or two, or even three sprockets in the reverse direction to compensate for the jump due to the change of chain wheel.

Such a maneuver is relatively slow and causes a break in the pedaling rate. This break is all the more pronounced as the change of chain wheel requires momentarily lightening the force exerted on the pedals to reduce the tension of the tensioned chain strand.

In addition, such a system lacks uniformity in the progression of the ratios, i.e., the rate of increase or decrease in the transmission ratio varies in an irregular manner when shifting gears, mainly upon a change of chain wheel.

This rate is related to the variation in torque which the cyclist exerts on the pedals. Certain gear shifts yield substantial variations in torque or, conversely, small variations resulting in a lack of ease of use for the cyclist.

Centralized control devices are also known, which synchronize the front and rear derailleurs so as to ensure a progressive variation in ratios. In particular, these devices are adapted to simultaneously control a change of chain wheel or a change of sprocket. A device of this type is described, for example, in the published patent document FR 2 750 669. The advantage is that the gear shifts are guided by a single control, even during a change of chain wheels. However, the problems of progressive variation in ratios and the shifting of the tensioned chain strand on the front are not resolved. Moreover, in the overlapping zones, this system imposes the combination of the chain wheel and sprocket; it does not leave any choice. Furthermore, it imposes a change of a plurality of sprockets simultaneously to a change of chain wheel. Therefore, the system is not very flexible.

For these conventional systems, there is also a problem related to the chain alignment, i.e., it is not recommended to associate the small sprocket with the small chain wheel, and conversely. An incorrect alignment causes a loss in efficiency, undesirable friction and noise during a change of sprockets and chain wheels. Certain combinations of sprockets and chain wheels are not used for this reason.

To reduce the number of ratios and avoid overlaps, it has been proposed to guide a change of transmission ratio solely by a change of sprockets.

Thus, the published patent document EP 849 155 proposes a transmission system including fourteen rear sprockets and a front chain wheel. To resolve a space requirement problem, the sprockets are very close to one another, and the chain has a particular construction that is narrower than a usual chain. In particular, the chain proposed in this patent document has inner links bent in the form of a bridge. Such a chain is not as strong as a more conventional chain, because the inner links are capable of bending.

Another cassette of fourteen sprockets is described in the published patent document EP 561 380. The sprockets here are juxtaposed, and the chain is meshed on one or the other by its lateral small plates.

A first disadvantage is that these systems require sprockets and a chain that have a very specific construction.

Another disadvantage is related to the chain alignment. Indeed, the sweep of the sprocket cassette requires that the chain be substantially out-of-line relative to the nominal angle given to it by the front chain wheel, resulting in a rapid wear and tear, loss in efficiency, and noise due to friction.

SUMMARY OF THE INVENTION

An object of the invention is to provide an improved transmission system that ensures a more varied progressiveness for the transmission ratio.

Another object is to provide a transmission system having two sources of variation in the transmission ratio, as are the sprockets and the chain wheels, where for the same ratio range, the number of combinations is further reduced, and the provision of chain wheels and/or sprockets or equivalent is less substantial.

Other objects and advantages of the invention will become apparent from the description that follows.

The transmission system of the invention is provided for a bicycle having a frame, a front wheel, a rear wheel with a hub and a hub shaft, and a drive bottom bracket assembly with a crank axle, including a transmission chain, a primary transmission sub-assembly having a set of sprockets provided to be mounted on the rear wheel, whose number of teeth varies generally, for at least a portion of them, along a geometric progression with a ratio of the numbers of teeth of two adjacent sprockets having a mean value n, such as n greater than 1, with a rear derailleur provided for transferring the chain from a given sprocket to an adjacent sprocket. At least one crown is provided for driving the chain associated with the bottom bracket assembly, and a secondary transmission sub-assembly is provided having at least two drive output ratios, whose ratio of the highest drive speed to the lowest drive speed is equal to a value R comprised between 1 and n.

According to a general feature of the invention, at least one intermediate ratio is created, with the secondary transmission sub-assembly, between the transmission ratios corresponding to two successive sprockets. In other words, at normal speed, the secondary transmission sub-assembly is activated between two changes of successive sprockets to change the transmission ratio and create an intermediate ratio. It is activated in the inverse direction at the time of the next change of sprocket.

The chain wheels of a conventional system yield a substantial variation in the transmission ratio, always greater than that induced by the sprockets. Instead of this, the secondary sub-assembly here yields a small variation in the transmission ratio, smaller than that induced by the sprockets.

With the system of the invention, one obtains a ratio range that is equivalent, or even wider than with a conventional system with a reduced number of sprockets, and a variation in the ratios that is better controlled, i.e., more progressive and more uniform.

The simultaneous change of sprocket and of ratios of the secondary sub-assembly here poses less problems than a traditional change of chain wheel. Indeed, as will become apparent in the following description, the secondary sub-assembly preferably does not act on the tensioned chain strand. In addition, as the ratio of the output ratios is comprised between 1 and the value R close to 1, the variation in the transmission ratio which it generates is small, in any event markedly smaller than that which occurs during a traditional change of chain wheel.

Furthermore, as the change of ratios of the secondary sub-assembly occurs upon each change of sprocket and between two changes of successive sprockets, it is easier to design a centralized control that guides the two transmission sub-assemblies.

BRIEF DESCRIPTION OF DRAWINGS

The invention will be better understood from the description that follows, with reference to the annexed drawings, in which:

FIG. 10 is a graph showing the variation in the transmission ratio for the embodiment described with the reference to FIG. 8.

DETAILED DESCRIPTION OF THE INVENTION

Figure 1:
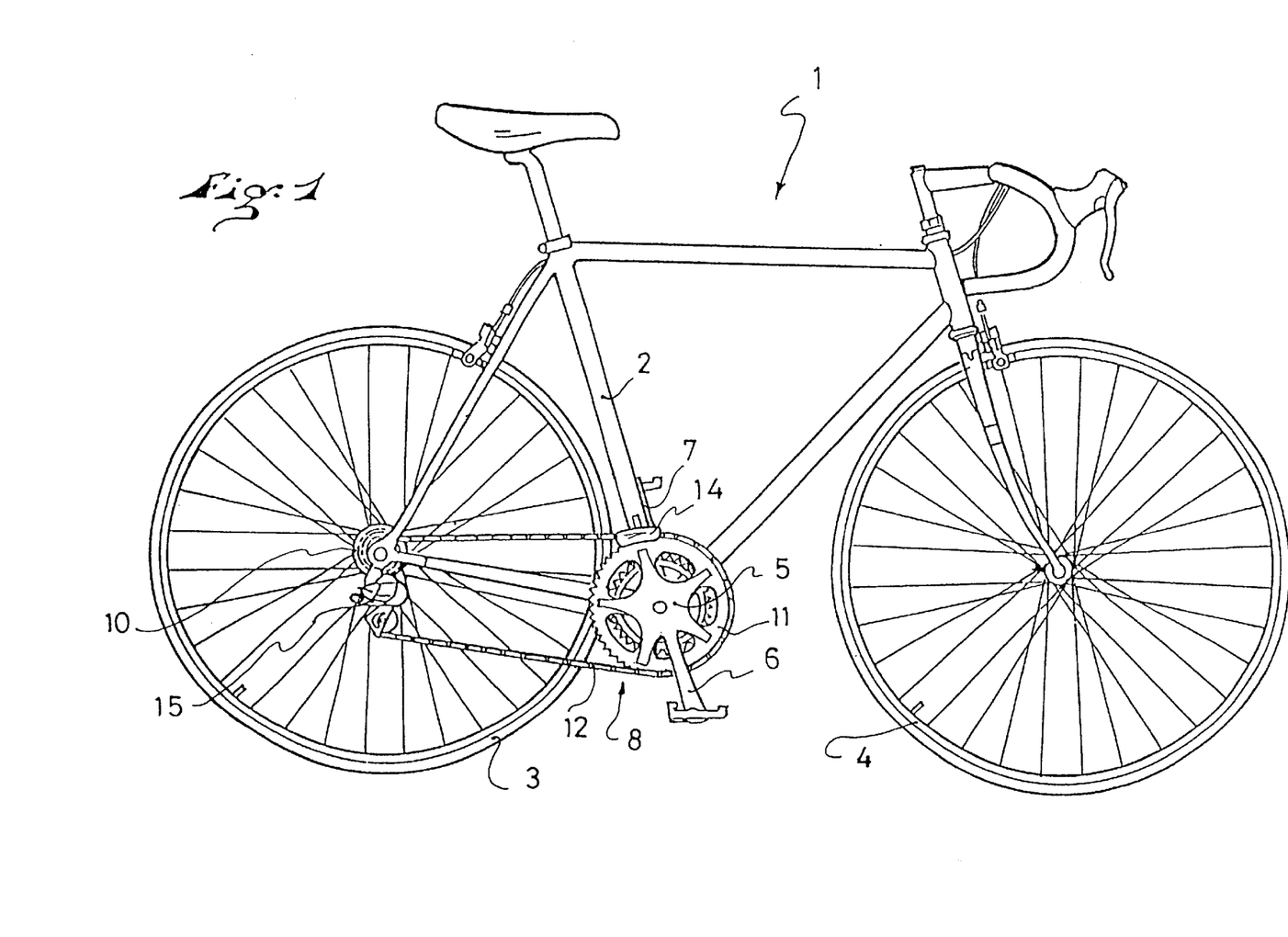
FIG. 1 is a side view of a bicycle.

FIG. 1 shows a bicycle 1 which, in a known manner, includes a frame 2, a rear wheel 3, a front wheel 4, a bottom bracket assembly 5 with two cranks 6 and 7 provided with pedals, and a transmission system 8 that transmits the rotation of the bottom bracket assembly to the rear wheel 3.

Usually, the transmission system 8 is composed of a sprocket cassette 10 mounted on the hub of the rear wheel, a set of chain wheels 11 assembled to the bottom bracket assembly 5, and a drive/transmission chain 12. Front and rear derailleurs 14 and 15 are also provided for passing the chain from one chain wheel to the other, and from one sprocket to the other, respectively.

Figure 2:
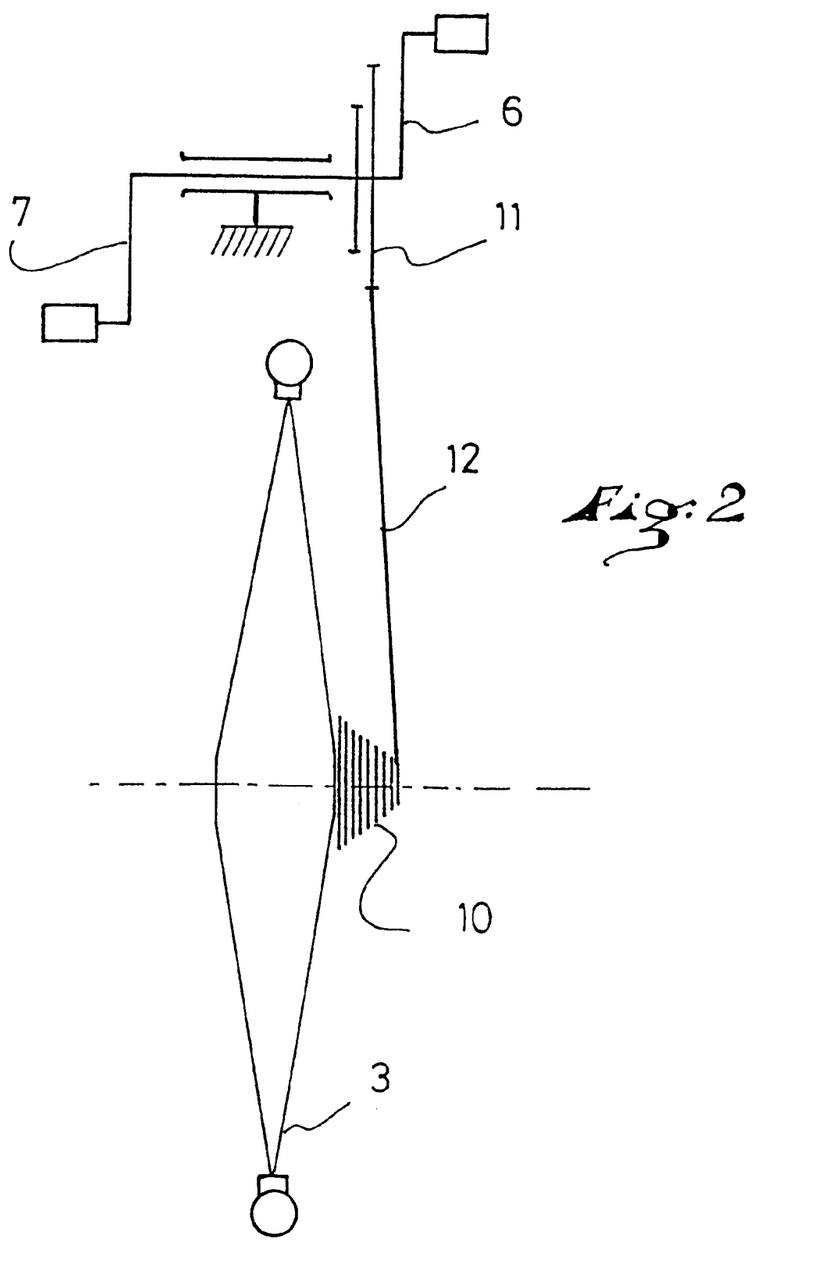
FIG. 2 schematically shows a conventional transmission system.

FIG. 2 schematically shows such a conventional transmission system adapted to a road bike.

For example, the sprocket cassette 10 is an ordinary cassette that includes nine sprockets having 12, 13, 14, 15, 16, 17, 19, 21, 23 teeth, respectively. The number of sprocket teeth varies roughly along a geometric progression whose ratio is on the order of 1.08, i.e., for two adjacent sprockets, the ratio of the numbers of teeth is close to 1.08. At the front, the set of chain wheels includes two chain wheels having 52 and 42 teeth, respectively.

For this transmission system, the following Table 1 gives the values of the transmission ratio, and the ratio deviation during a gear shift. To facilitate understanding, a range of the transmission ratios has been arbitrarily selected, from the highest ratio corresponding to the largest chain wheel and to the smallest sprocket toward the lowest ratio corresponding to the small chain wheel and large sprocket.

The transmission ratio is calculated by the ratio of the number of teeth of the chain wheel and of the sprocket in use. The variation in the transmission ratio is calculated according to the following formula:

$$\left[\frac{\text{(previous transmission ratio)}}{\text{(new transmission ratio)}} - 1\right] \times 100$$

The first column designates the chain wheel and the sprocket in use by their number of teeth, 52×12 meaning that the chain is engaged on the 52-tooth chain wheel and the 12-tooth sprocket.

TABLE 1

| chain wheel/sprocket | transmission ratio | ratio deviation % |
|---|---|---|
| 52 × 12 | 4.33 | |
| 52 × 13 | 4.00 | 8.33 |
| 52 × 14 | 3.71 | 7.69 |
| 52 × 15 | 3.47 | 7.14 |
| 52 × 16 | 3.25 | 6.67 |
| 52 × 17 | 3.06 | 6.25 |
| 52 × 19 | 2.74 | 11.76 |
| 52 × 21 | 2.48 | 10.53 |
| 52 × 23 | 2.26 | 9.52 |
| 42 × 12 | 3.50 | −35.40 |
| 42 × 13 | 3.23 | 8.33 |
| 42 × 14 | 3.00 | 7.69 |
| 42 × 15 | 2.80 | 7.14 |
| 42 × 16 | 2.63 | 6.67 |
| 42 × 17 | 2.47 | 6.25 |
| 42 × 19 | 2.21 | 11.76 |
| 42 × 21 | 2.00 | 10.53 |
| 42 × 23 | 1.83 | 9.52 |

The table shows that the range of the transmission ratios extends from 4.33 to 1.83, which yields an overall ratio of 2.37.

Figure 3:
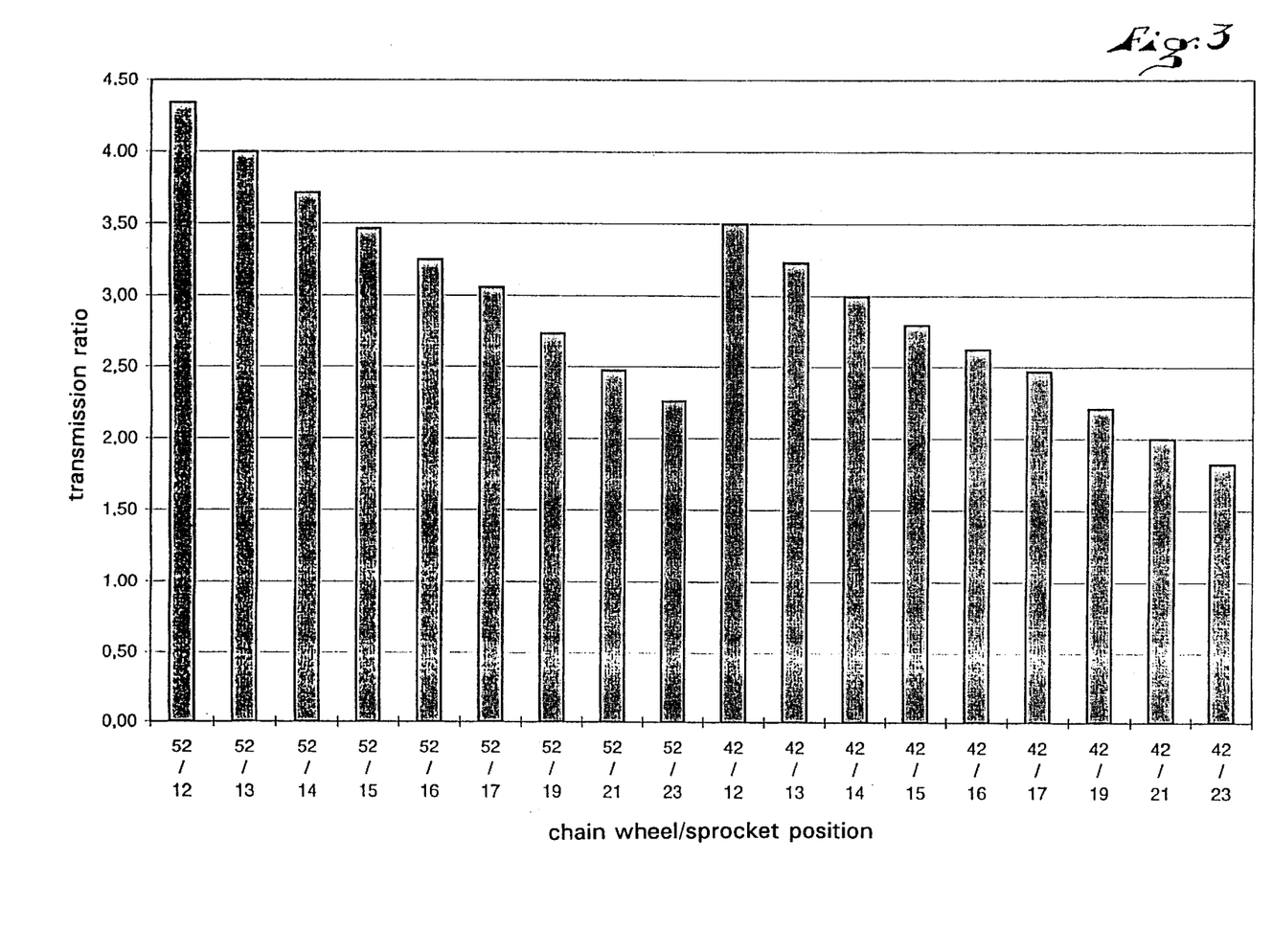
FIG. 3 is a diagram showing the variation in ratios obtained with the conventional system of FIG. 2.

Referring to the graph shown in FIG. 3, one can readily see the overlapping of the ratio ranges associated with the first and second chain wheel. Out of the eighteen possible ratios, between ten and twelve ratios can indeed be exploited.

With respect to the variation in the transmission ratio, which is representative of the change in pedaling rate accompanying a change of ratios, it is noted that this variation is not at all uniform during changes of sprockets. It decreases uniformly up to 6% as long as the number of sprocket teeth varies by one tooth, then increases markedly beyond 10% for the last three sprockets where there is a difference of two teeth each time. This induces a lack of comfort for the cyclist, because the change in pedaling rate and the variation in torque that accompany a gear shift lack uniformity over the entire range of transmission ratios.

A change of sprocket causes a variation in the transmission ratio that is generally comprised between 6% and 12%. Conversely, a change of chain wheel causes a variation in ratio of $(52/42-1) \times 100 = 23\%$.

This explains the overlap of the ratio ranges. A change of chain wheel indeed yields a variation in ratio which is that of two, or even three changes of sprockets.

In relation to this, the invention proposes to introduce at least one intermediate ratio between two successive sprockets. Concurrently, the variation in ratio for two successive sprockets is substantially increased. In other words, the transmission system according to the invention includes a primary transmission sub-assembly formed by a set of sprockets, and a secondary transmission sub-assembly having at least two transmission speeds. This secondary sub-assembly creates at least one intermediate transmission ratio between two successive sprockets.

Figure 4:
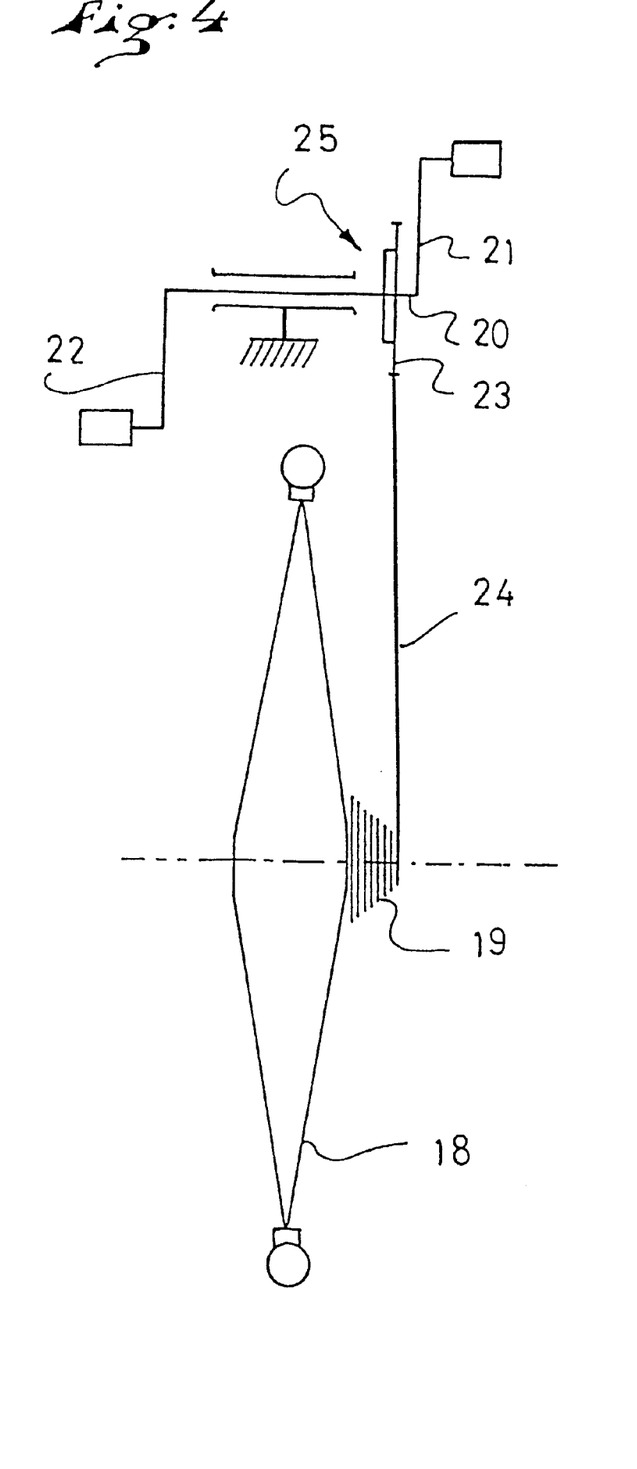
FIG 4 schematically shows the invention according to a first embodiment.

A first embodiment of the invention is schematically shown in FIG. 4.

This figure shows a rear wheel 18, and a set of sprockets 19 mounted on the hub of the rear wheel. In the language of the invention, these sprockets form the primary transmission sub-assembly. Good results have been obtained with a cassette of eight sprockets having 11, 13, 15, 18, 21, 25, 30, 36 teeth. However, as will appear subsequently, the number of sprockets can be smaller as a function of the desired range of transmission ratios.

The primary sub-assembly further includes a conventional rear derailleur and its control, for transferring the chain from one sprocket to the other. For example, the rear derailleur that is described in the commonly owned published patent document EP 558 425, and U.S. Pat. No. 5,358,451, can be used.

At the front, the system of FIG. 4 shows a bottom bracket assembly with an axle 20, and two cranks 21 and 22. A single chain wheel 23, or rather a chain wheel crown, is associated with the front bottom bracket assembly; this crown drives a chain 24. The chain is engaged with the crown and one of the sprockets.

According to the invention, the transmission system includes a secondary transmission sub-assembly schematically designated by the reference numeral 25. This relates here to a chain wheel whose outer diameter is extensible. The chain wheel has a toothed crown 23 that is divided into sectors, and the sectors are radially extensible so as to increase or decrease the winding distance of the chain in relation to the crank axle 20. A chain wheel of this type is described, for example, in the published patent document FR 961 520.

Under these conditions, the secondary sub-assembly has the chain wheel in question, and an appropriate control mechanism for displacing the sectors.

Figure 5:
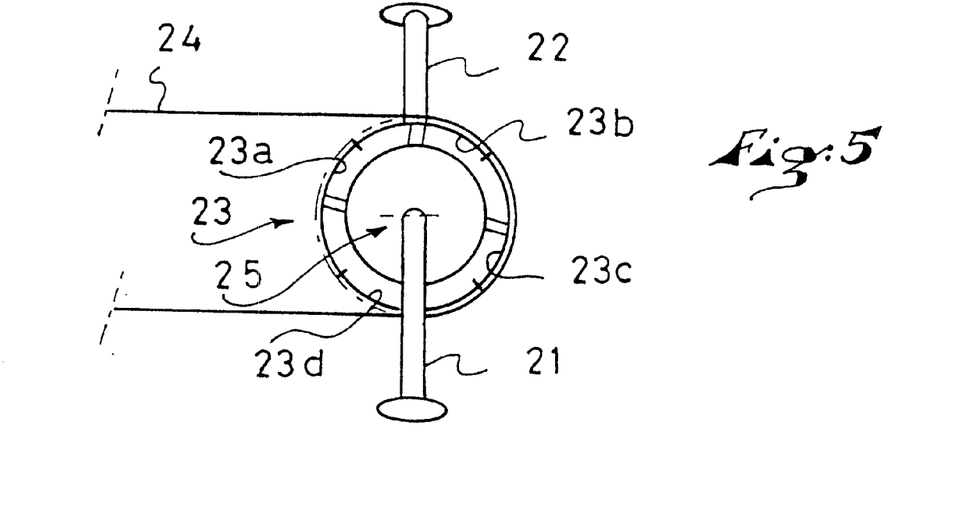
FIG. 5 schematically shows a side view of the first state of the secondary sub-assembly.

Good results have been obtained with a 44-tooth chain wheel including four radially extensible sectors 23a, 23b, 23c, 23d. In its smallest diameter configuration shown in FIG. 5, the four sectors are contiguous, such that the chain wheel behaves like a conventional chain wheel. The extension-wise displacement of the sectors is determined so that there is between two adjacent sectors a space equal to an integer of the chain pitch. Preferably, this space is equal to one chain pitch, and corresponds to one tooth.

Figure 6:
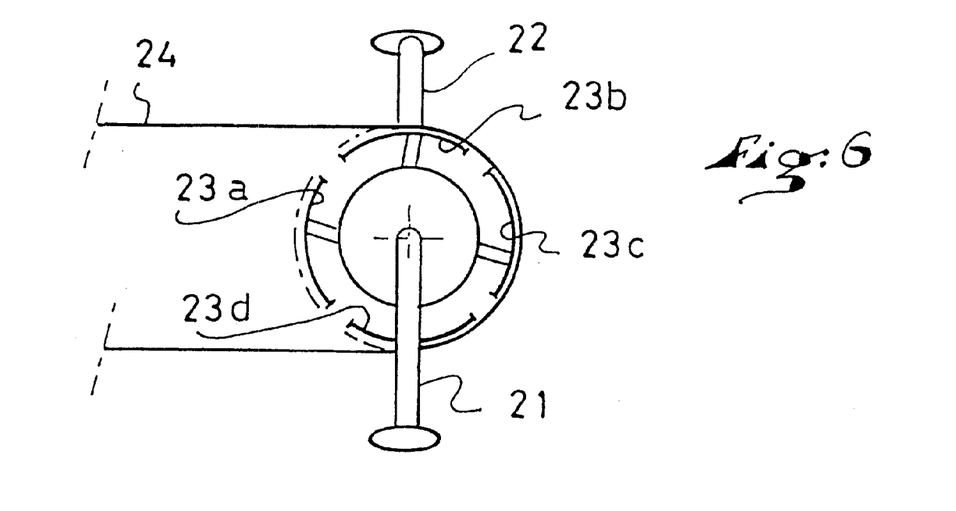
FIG. 6 shows the second state of the secondary sub-assembly of FIG. 5.

FIG. 6 schematically shows the chain wheel in this second state where the sectors are radially expanded. The chain wheel then behaves like a 44-tooth chain wheel. Under these conditions, it can be said that the chain wheel has a real number of forty-eight teeth and, in the extension position of the sectors, an apparent number of forty-eight teeth.

With respect to the control mechanism, it is provided to act on each sector depending on its position. To displace the sectors outwardly or inwardly, the control mechanism preferably acts successively on each of the sectors while this sector is located in the inactive zone of the bottom bracket assembly, i.e., in a rising phase beneath the tensioned chain strand. In this way, the tensioned chain strand is radially biased with respect to the crank axle, and no longer transversely.

The transmission ratio of this transmission system is equal to the ratio between the real or apparent number of teeth of the chain wheel, and the number of teeth of the sprocket in use.

The variation in the transmission ratio during a change in the state of the chain wheel, or during a change of sprocket is given by the ratio between the final number of teeth and the initial number of teeth of the chain wheel, or of the sprockets, respectively.

For such a system having eight sprockets, the number of teeth n1, n2, n3, n4, n5, n6, n7, n8 of the sprockets varies along a geometric progression to the nearest integer. If r is the ratio of the geometric progression, n1, n2, n3, n4, n5, n6, n7, n8 are determined such that n2=rn1, n3=rn2, and so on, to the nearest the integer.

Further, if the real and apparent numbers of teeth of the chain wheel are identified as N1 and N2, the variations in the transmission ratio are respectively given by the ratios n1/n2, n2/n3, n3/n4, n4/n5, n5/n6, n6/n7, n7/n8, on the one hand, and N1/N2, on the other hand. N1/N2 in fact corresponds to the ratio of the drive speeds of the chain which the sub-assembly 25 is adapted to generate.

For simplification, as in the preceding case, a range of ratios from the highest ratio toward the lowest is considered.

Under these conditions, if n designates the mean value of the ratios n1/n2, n2/n3, n3/n4, n4/n5, n5/n6, n6/n7, n7/n8, and R the ratio N1/N2, apparent numbers of teeth of the chain wheel, and those of the sprockets are determined so as to respect the equation n>R>1.

Indeed, taking into account the selected range direction, n is inherently greater than 1. This value n is further approximately equal to the ratio r of the aforementioned geometric progression.

The relation n>R>1 means that a change in the state of the chain wheel is capable of creating an intermediate variation in ratio between the variation created by a change of sprockets.

Preferably, a value R is selected, which is close to the square root of n, or yet close to (1+n)/2 which is an approximate value thereof.

In any event, R is close to 1, and it is always less than the lowest of the ratios of the numbers of teeth of two successive sprockets.

In the present case, R=1.09.

This system is provided to function in the following manner. Starting with the highest transmission ratio, the first gear shift consists of a change in the state of the chain wheel, the second consists of a simultaneous change of sprockets and of a change in the state of the chain wheel to bring it back to its initial state, then a change in the state of the chain wheel once again, and so on.

A centralized control device for controlling this system would have a centralized guiding device connected to the derailleur of the primary sub-assembly and the secondary sub-assembly provided to alternatively address to the secondary sub-assembly a gear shift control in the desired direction for the variation in the speed ratio, and a gear shift control addressed to the primary sub-assembly in the desired variation direction combined with a control addressed to the secondary sub-assembly in the variation direction opposite the desired direction.

Such a control device can be obtained mechanically by a double cam groove mounted on a same control handle, as is described, for example, in the published patent document WO 96/25321.

Another advantageous way of obtaining the control device is that of an electronic management for controlling the primary and secondary sub-assemblies. Such a device is particularly suited when the derailleur of the primary sub-assembly is consistent with the aforementioned patent document EP 558 425, and U.S. Pat. No. 5,358,451, and when the secondary sub-assembly is also electrically controlled, for example, by one or more electromagnets.

The following Table 2 indicates the transmission ratios and the variations in ratios for a system including eight sprockets having 11, 13, 15, 18, 21, 25, 30, 36 teeth, respectively, and a chain wheel having two states corresponding to 48 and 44 teeth, respectively. Such a system is adapted to a road bike.

TABLE 2

| state of the chain wheel | number of sprocket teeth | transmission ratio | variation in ratio % |
| --- | --- | --- | --- |
| 48 | 11 | 4.36 | |
| 44 | 11 | 4.00 | 9.09 |
| 48 | 13 | 3.69 | 8.33 |
| 44 | 13 | 3.38 | 9.09 |
| 48 | 15 | 3.20 | 5.77 |
| 44 | 15 | 2.93 | 9.09 |
| 48 | 18 | 2.67 | 10.00 |
| 44 | 18 | 2.44 | 9.09 |
| 48 | 21 | 2.29 | 6.94 |
| 44 | 21 | 2.10 | 9.09 |
| 48 | 25 | 1.92 | 9.13 |
| 44 | 25 | 1.76 | 9.09 |
| 48 | 30 | 1.60 | 10.00 |
| 44 | 30 | 1.47 | 9.09 |
| 48 | 36 | 1.33 | 10.00 |
| 44 | 36 | 1.22 | 9.09 |

The range of transmission ratios extends from 4.36 up to 1.22, which yields an overall ratio of 3.57.

Figure 7:
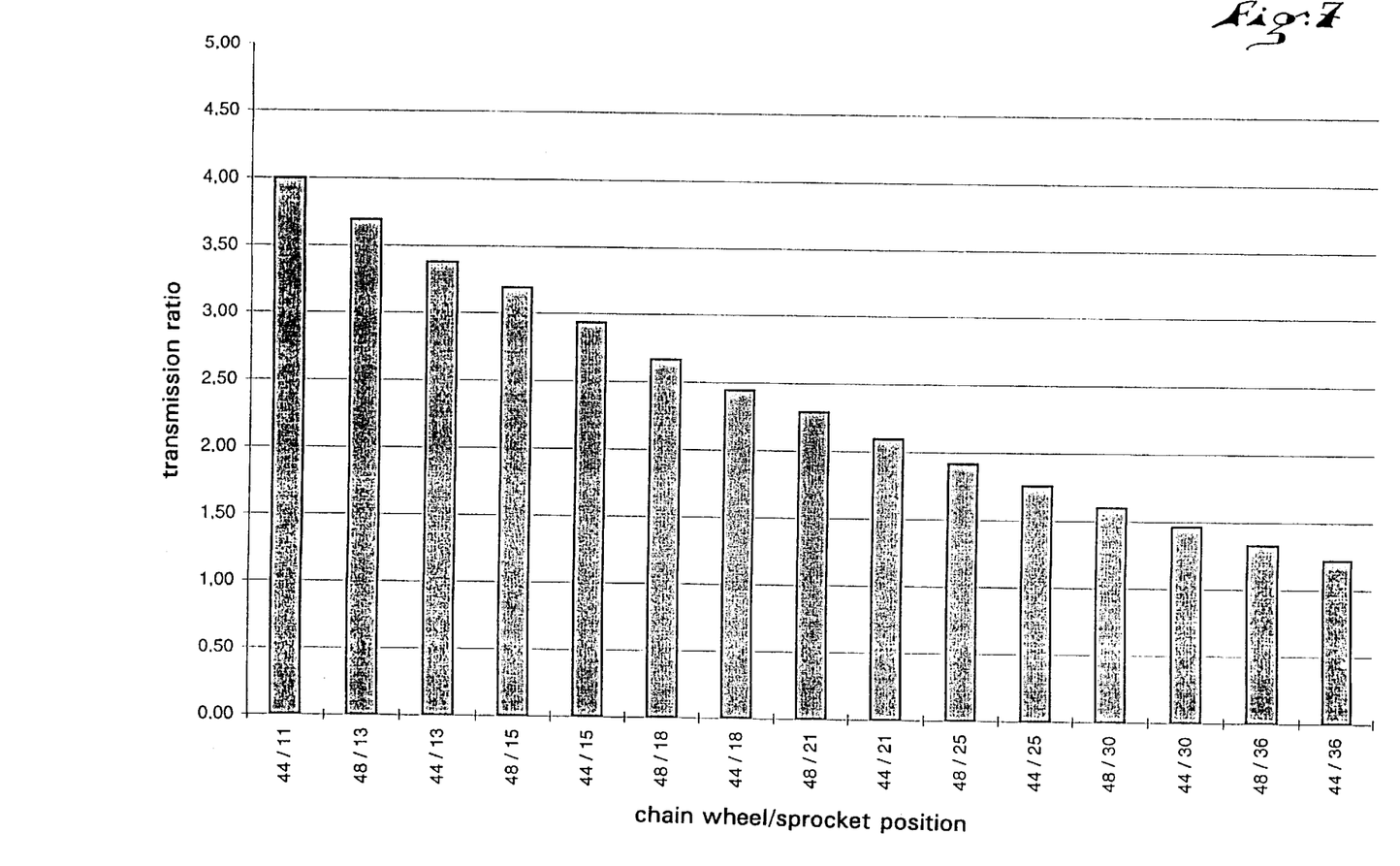
FIG. 7 is a diagram that shows the change in the transmission ratio.

If Table 2 and the graph of FIG. 7 are compared to the results of the previously described example, it is noted that there is no longer any overlap in the successions of the various ratios. Moreover, the variation in the ratios is much more uniform and centered by a value of 8%, which improves comfort and flexibility of use of the system. In addition, the range of the ratios is wider.

Furthermore, it can be noted that a range of transmission ratios equivalent to the range of a conventional system could be covered with only six sprockets, by suppressing the largest diameter sprockets.

By reducing the number of sprockets with respect to a conventional system, the problems related to an incorrect chain alignment are attenuated. This incorrect alignment occurs indeed over a lower angular amplitude.

The space requirement of the sprocket cassette on the hub body is also reduced, which makes it possible to space the flanges for attaching the spokes on the hub from one another, resulting in a better balancing of the spoke tensions and a more substantial rigidity of the wheel. Weight is also gained in the area of the sprockets.

It is certain that there are more changes in ratios in the area of the secondary sub-assembly, in comparison to a conventional system.

However, these changes in ratios occur alone or in combination with a single change of sprocket. Furthermore, they cause a variation in ratio which is close to 1 each time. This variation is smaller than in the conventional example. Finally, the changes in ratio are caused by an expansion of the chain wheel, and not by a derailleur acting on the tensioned chain strand. As a result, the chain remains in the same plane. Efficiency is much better, and the transition periods are shorter.

This embodiment is not limiting. In particular, other values for the number of teeth could be adopted. Also, a three-state chain wheel, rather than a two-state chain wheel, could be used. In this case, if R and R' designate the ratios of the real or apparent numbers of successive teeth of the chain wheel, one would have the following equation:

$$n > R \times R' > 1$$

This means that the ratio of the largest number of teeth to the smallest number is considered, such that all of the states of the chain wheel produce intermediate ratios.

In operation, with such a device, there would be two successive changes in the state of the chain wheel, then a change in state toward the original position combined with a change of sprocket, and so on.

Other constructions of the secondary sub-assembly varying its number of teeth could also be considered. For example, two chain wheels could be used whose number of teeth are in the ratio R, for example, forty-eight and forty-four teeth to use the previously described example.

Preferably, the transfer of the chain from one chain wheel to the other is provided to occur in a manner other than by a direct action on the tensioned chain strand, as does the fork of a conventional derailleur.

A first solution could consist of using chain wheels having tilting sectors. Such a device is described in U.S. Pat. No. 4,580,997. Another solution would be to use chain wheels, with at least one of them being spirally deformable. Such a construction is described in the commonly owned published patent document FR 2 798 114. In both cases, the deformation of the chain wheel deviates the tensioned chain strand such that it is placed smoothly on the other chain wheel. Thus, one avoids straining the tensioned chain strand.

Another solution could comprise two chain wheels with a chain transfer made by means of a conventional derailleur. However, for the reasons mentioned above, this solution is not a preferred solution.

But as the difference in the diameter of the chain wheels here is smaller than for a conventional set of chain wheels, a better functioning can be expected.

For this mode of construction, where there is a variation in the number of chain wheel teeth, the ratio R is the ratio of the numbers of teeth; it corresponds in fact to the ratio of the linear speeds of the chain.

The invention is not limited either to the embodiment of the secondary sub-assembly that has been described.

Figure 8:
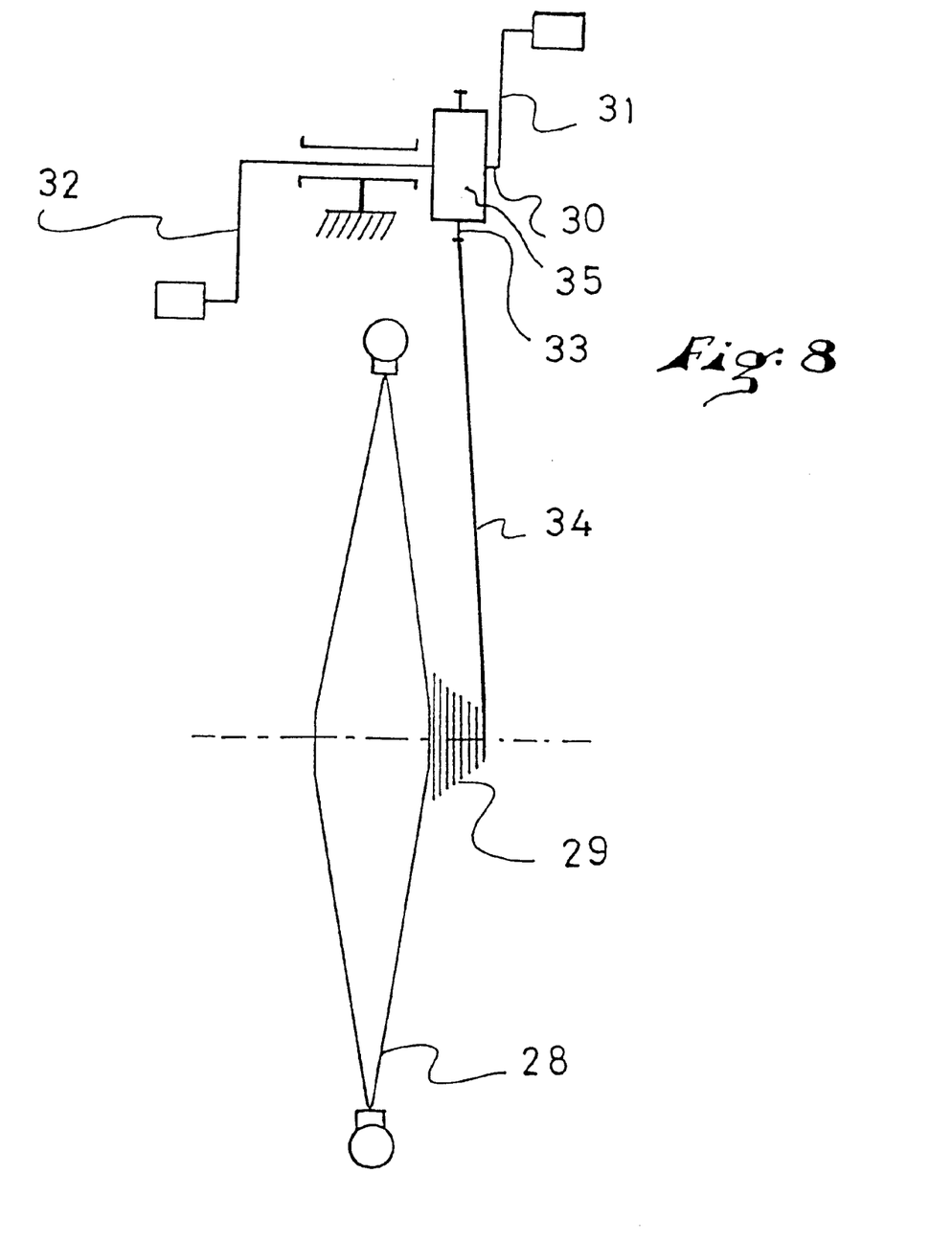
FIG. 8 schematically shows the invention according to a second embodiment of the invention.

To illustrate this, FIG. 8 schematically shows a rear wheel 28, a primary transmission sub-assembly 29 that is similar to the preceding sub-assembly 19. As in the case previously described, the system has a bottom bracket assembly with an axle 30 and two cranks 31, 32 at the front.

The secondary sub-assembly here is formed by a gear box schematically designated by the reference numeral 35, which carries a toothed crown 33 at its periphery for driving the chain 34.

The gearbox 35 has a known structure. It is connected at the input to the axle 30 of the bottom bracket assembly, and at the output to the crown 33 for driving the chain. The box 35 has at least two ratios, i.e., two different rotation speeds at the output varying in a ratio R of the highest speed to the lowest speed.

Under these conditions, starting from the smallest sprocket to the largest sprocket, if n is the mean ratio between the number of teeth of two successive sprockets, R is determined such that n>R>1, with R being close to 1, and preferably R being close to the square root of n.

Thus, for each of the rear sprockets, the gear box 35 can induce an intermediate transmission ratio between the ratios given by two successive sprockets.

Preferably, one of the ratios of the gear box is equal to 1. In any event, it is possible to optimize the efficiency of the box, given that all of the ratios of the gear box will then be close to 1, regardless of the speed selected at the box output.

Such an embodiment has the advantage that the ratio R can be determined with less constraint than in the preceding case. Indeed, this ratio no longer relates to a number of chain wheel teeth, but, for example, to diameters and numbers of gear teeth. In this case, the pitch of the gears is completely independent of the pitch of the chain. One can also vary the number of teeth of the crown 33 independently of the ratio R. Therefore, it is much easier to adjust the ratio R to the desired value.

Furthermore, crown 33 is the only crown, and the chain remains in the same plane in the case of a change in the ratio of the gear box.

As in the preceding case, rather than two ratios, the box 35 could offer three output ratios with different ratios.

Figure 9:
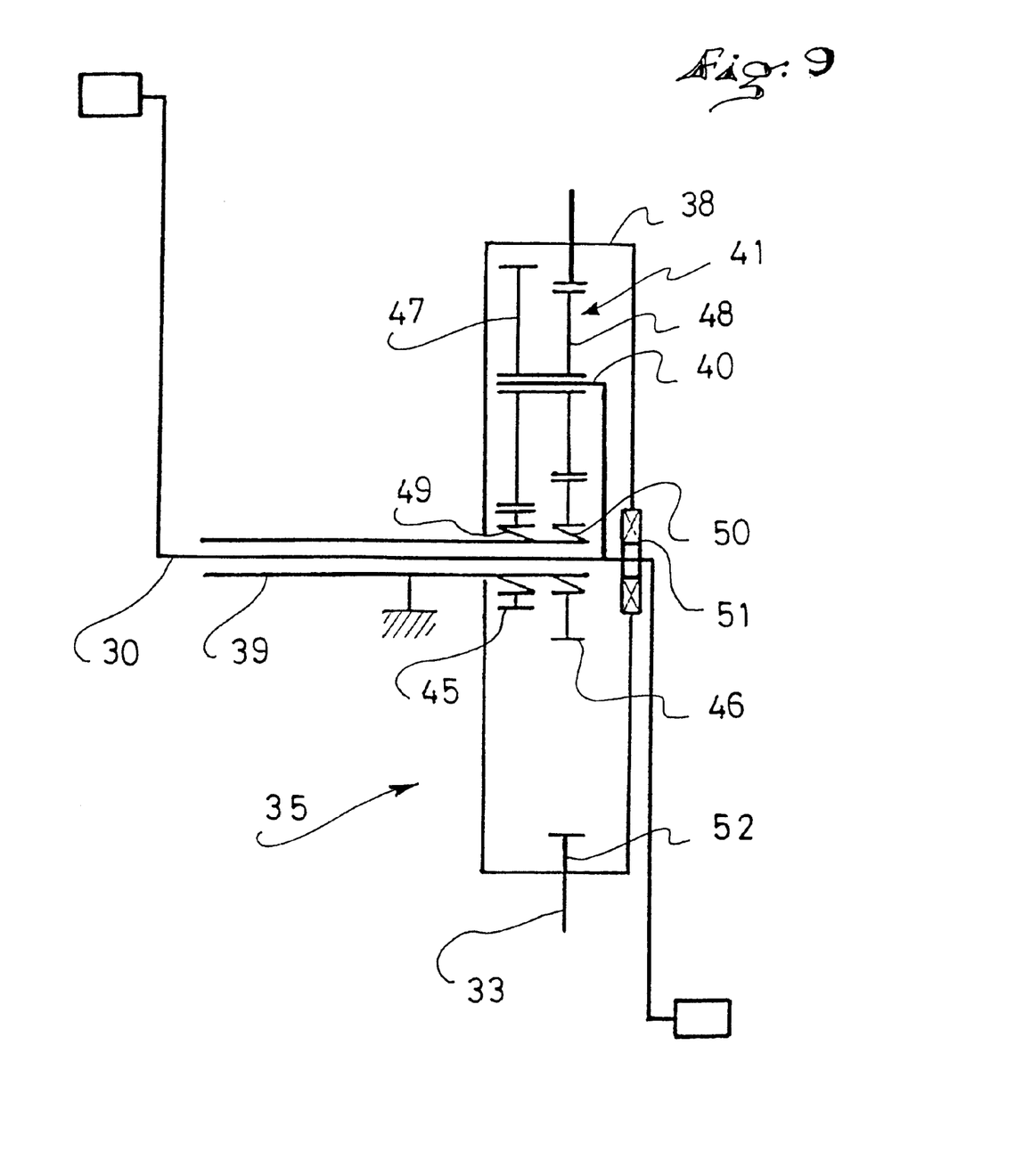
FIG. 9 schematically shows the structure of a three-ratio gear box.

To illustrate this, FIGS. 9 and 10 show a transmission system that is more adapted to an all-terrain bike using a three-ratio gear box 35 integrated in the bottom bracket assembly and associated with a cassette of five sprockets. For an all-terrain bike, it is interesting to have a range of transmission ratio that is wider than for a road bike. Moreover, between two successive ratios, one can have a more substantial variation than for a road bike. A variation rate on the order of 12–15% is considered suitable in terms of flexibility and ease of use.

FIG. 9 schematically shows the structure of the gear box 35 having epicycloidal gear trains. The toothed crown 33 is assembled at the periphery of a housing 38 rotatably mounted about the crank axle 30 and the guide tub 39 of this axle. In fact, the guide tube is part of the bicycle frame.

The crank axle 30 rotationally drives along at least one support and rotational transverse axle 40 for a satellite 41 formed by a double gear. Preferably, the number of teeth of the gears is selected so as to be divisible by two or three, so that the box is equipped with two or three of these axles 40 and satellites distributed in star-like form at 180 or 120 degrees from one another about the axle 30.

Two gears 45 and 46 are further engaged with the toothed wheels 47 and 48 of the satellite 41. These gears are rotatably mounted about the axle 30 and its guide tube 39. They are connected to the guide tube by a disengageable locking mechanism 49 and 50, respectively. In the disengaged position, each of these two mechanisms affixes the gear with which it is associated to the guide tube, i.e., to the frame. The control mechanism is of any appropriate type, for example, a grooved sleeve movable along the axis of the tube 39, whose grooves engage with the complementary grooves of the gear. One could also use freewheel mechanisms having a remotely controlled locking pawl; in this case, the mechanism could be a unidirectional locking mechanism only.

A third unidirectional locking freewheel mechanism 51 connects the axle 30 of the bottom bracket assembly to the housing 38.

The three mechanisms 49, 50, 51 lock in the direction of rotation that corresponds to the normal direction of rotation of the bottom bracket assembly.

Finally, the gear 35 has, toward the interior of the housing, a toothed wheel 52 with an inner toothing engaged on the gear 48 of the satellite 41.

In the embodiment shown, the toothed wheel 52 has seventy-two teeth, the gears 46 and 48 have twenty-four teeth and twenty-seven teeth, respectively; the gears 45 and 47 have fifteen and thirty-six teeth, respectively.

Under these conditions, when neither mechanism 49 or 50 is in the locking state, the axle 30 drives the housing 38 and the crown 33 in direct engagement by means the freewheel 44 that is then in the locking position. The transmission ratio of the gear box is 1/1, i.e., the axles 40, satellites 41, and gears 45 and 46 rotate with the housing and the wheel 51 at the same rotating speed.

When the mechanism 49 is guided in the locking position, the gear 45 is immobilized with respect to the tube 39 of the frame. Since the satellite 41 is rotationally driven about the axle 30 by the bottom bracket assembly, the immobilization of the gear 45 forces the satellite to rotate about its axle 40. The satellite then drives the housing 38 via the toothed wheel 52 engaged with the gear 48 of the satellite. The housing is driven at a higher rotation speed than that of the crank axle, such that the freewheel mechanism 51 disengages on its own.

In view of the numbers of teeth of the various gears, the speed ratio between the output speed of the housing and the input speed of the bottom bracket assembly is equal to R1=1.1442.

If the other mechanism 50 is locked, the gear 46 is then immobilized about the tube 39, thus forcing the satellite 41 to rotate in relation thereto. The gear 48 of the satellite directly drives the housing 38 by its toothed wheel 52.

In view of the numbers of teeth of the various gears 46, 48, and 52, the speed ratio between the rotating speed of the housing and the input speed of the bottom bracket assembly is equal to R2=1.3076. As in the preceding case, the freewheel 51 is disengaged because the housing rotates faster than the bottom bracket assembly.

Moreover, as the ratio here is higher than the ratio obtained with the locking of the mechanism 49, this means that the satellite 41 drives the gear 45 in its rotation, and that the freewheel mechanism 49 disengages on its own. This makes it possible to simplify the guiding of the two mechanisms 49 and 50. Under these conditions, there would indeed be only three guiding controls. According to the first control, neither of the two mechanisms 49, 50 is guided in the locking position, and the gear 35 then functions with a ratio equal to 1. According to a second control, the mechanism 49 is guided in the locking position; the ratio becomes R1=1.1442. According to a third control, the mechanism 50 is guided in the locking position; the ratio then changes to R2=1.3076. In this third control, the mechanism 49 can remain in the locking position; it will be disengaged anyway.

These three states of the box 35 are used between two changes of successive rear sprockets.

For the transmission of the chain, one has selected a crown 33 having 31 teeth, and a cassette of five rear sprockets having 10, 15, 22, 33, 49 teeth, respectively, i.e., a number of teeth varying along a geometric progression to the nearest integer, whose ratio is equal to 1.5.

The ratios of the gear box 35 have in fact been determined so as to be inserted between two changes of successive sprockets.

The ratio of the number of teeth of two successive sprockets varies between 1.446 and 1.5. Under these conditions, the ratio n of two successive sprockets is higher than or equal to 1.446. The speed ratios of the box 35 have been selected between the value 1 and the value n=1.446. Furthermore, to improve the progressiveness of the intermediate ratios, the ratios R1 and R2 of the gear box 35 have been determined such that R1 is close to the cube root of n, and R2 is close to the square root of R1.

In the selected example, $R1^3=1.5$ and $R1^2=1.309$ which are suitable values. Under these conditions, the following Table 3 provides the successive transmission ratios, from the highest ratio toward the lowest, as well as the variations in percentage of this ratio.

TABLE 3

| number of teeth of the front chain wheel | ratio of the gear box | position of the secondary sub-assembly | number of teeth of the rear sprocket | transmission ratio | variation of the transmission ratio % |
|---|---|---|---|---|---|
| 31 | 1.3077 | 31 × 1.3077 | 10 | 4.05 | |
| 31 | 1.1442 | 31 × 1.1442 | 10 | 3.55 | 14.29 |
| 31 | 1 | 31 × 1 | 10 | 3.10 | 14.42 |
| 31 | 1.3077 | 31 × 1.3077 | 15 | 2.70 | 14.71 |
| 31 | 1.1442 | 31 × 1.1442 | 15 | 2.36 | 14.29 |
| 31 | 1 | 31 × 1 | 15 | 2.07 | 14.42 |
| 31 | 1.3077 | 31 × 1.3077 | 22 | 1.84 | 12.16 |
| 31 | 1.1442 | 31 × 1.1442 | 22 | 1.61 | 14.29 |
| 31 | 1 | 31 × 1 | 22 | 1.41 | 14.42 |
| 31 | 1.3077 | 31 × 1.3077 | 33 | 1.23 | 14.71 |
| 31 | 1.1442 | 31 × 1.1442 | 33 | 1.07 | 14.29 |
| 31 | 1 | 31 × 1 | 33 | 0.94 | 14.42 |
| 31 | 1.3077 | 31 × 1.3077 | 49 | 0.83 | 13.55 |
| 31 | 1.1442 | 31 × 1.1442 | 49 | 0.72 | 14.29 |
| 31 | 1 | 31 × 1 | 49 | 0.63 | 14.42 |

FIG. 10 is a graph that shows the change in the transmission ratio.

Looking at Table 3 and the graph of FIG. 10, one can note that the transmission ratios extend in a range of 4.05 to 0.63, i.e., an overall ratio of 6.43 for five sprockets at the rear. With respect to the variation in ratio, one can see from Table 3 is substantially uniform, and that it is in the vicinity of 14%, which provides a very progressive transmission system, with no overlap.

The overall ratio is higher than for a conventional system, whereas the variation is smaller. For a conventional system, one generally counts a ratio of 6.18 and a mean variation of 18.2%.

Finally, the transmission ratio of the secondary sub-assembly can be modified without any intervention on the chain, in particular on the tensioned chain strand. The chain remains in the same plan. A change in ratio is therefore faster and easier than with a conventional front derailleur.

Alternatively, one could select the ratios of the box 35 in a different manner and assign a ratio 1/1, not to the slowest speed of the crown 33, but to the highest speed, or yet to the intermediate speed.

Figure 11:
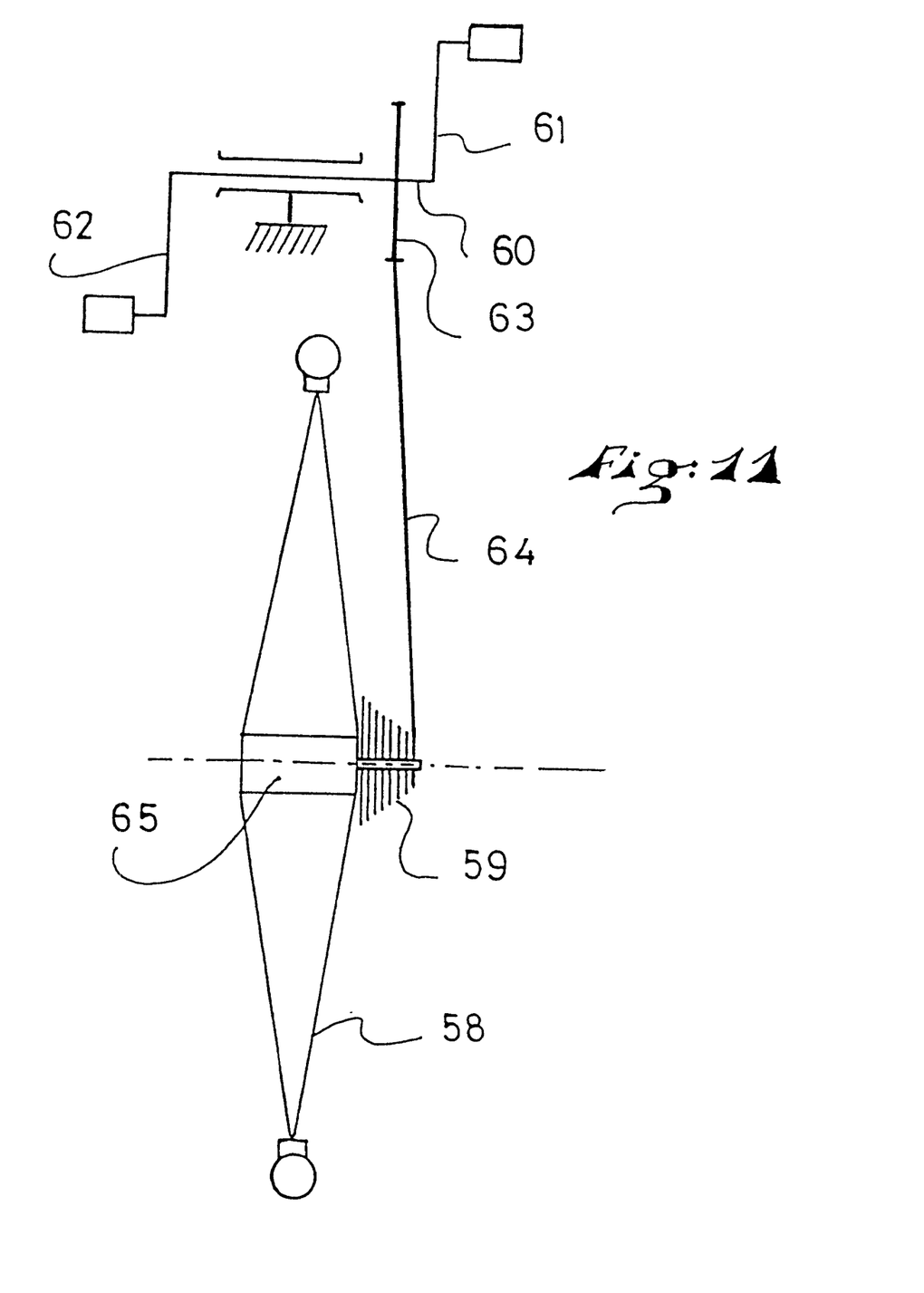
FIG. 11 relates to a third embodiment of the invention.

FIG. 11 relates to another embodiment of the invention.

This figure schematically shows a rear bicycle wheel 58. On the front, the transmission system has a bottom bracket assembly with an axle 60, two cranks 61 and 62, and a chain wheel 63 rotationally affixed to the axle 60 and to the cranks 61, 62, with a single crown for driving the chain.

On the rear, the system includes a set of sprockets 59 mounted on the hub shaft, and a gear box schematically designated by the reference numeral 65 that is located between the hub and the wheel. This means that the gear box is connected at the input on the hub shaft, and that it is connected at the output to the spokes and to the rim of the wheel. The gear box 65 is in fact integrated in the wheel hub. Such a box is, for example, described in the published patent document EP 554 874 and U.S. Pat. No. 5,399,128.

As in the preceding cases, the sprockets that form the primary transmission sub-assembly are associated with a conventional rear derailleur. The mean ratio of the number of teeth is equal to n, starting from the smallest sprocket to the largest diameter sprocket.

The secondary transmission sub-assembly has at the output at least two ratios, whose ratio of the highest output speed to the lowest speed is equal to R, R being close to 1 and comprised between n and 1.

As in the preceding case, one of the output speeds of the gear box is preferably equal to the input speed, so that the reduction ratio is generally close to 1, so that the general output of the gear box is also close to 1. Preferably, R is close to the square root of n or yet (1+n)/2 which is an approximate value thereof.

This transmission system functions in the same manner as the previously described systems.

Thus, the invention procures a greater progressiveness in the successive passage of the sprockets, a lack of overlap of the ranges of transmission ratios, a greater uniformity in the variation of the transmission ratio. In addition, a smaller number of sprockets and a significant number of commercially available standard elements can be used. The sprockets, rear derailleur, and chain can indeed be standard elements. Which means that an existing bicycle can be easily transformed to receive this new transmission system.

With respect to the secondary transmission sub-assembly, it has been found that two output speeds, which correspond to two states of the chain wheel for the first embodiment, were preferred. Three output ratios are also suited, but there is no apparent interest in going beyond that. The reason is that the primary sub-assembly with its derailleur has a very good efficiency during a change of sprocket, and a very good compromise between the weight and the performances, which is difficult to achieve with another method of shifting gear. As a result, it is preferred to limit the number of output ratios of the secondary transmission sub-assembly to two or three to take full advantage of the performances of the primary sub-assembly.

Furthermore, the general idea of the invention could be applied to only a single portion of the sprockets. It has been said that the numbers of sprocket teeth roughly follows a geometric series, and that the secondary sub-assembly places an intermediate ratio between the ratios of two successive sprockets. This geometric series could be interrupted or shortened by a sprocket whose number of teeth would be in a ratio R, to the nearest integer, rather than being in the ratio n with the previous sprocket. On this sprocket, there would be no change of speed of the secondary sub-assembly. One would go directly to the next sprocket. The control mechanism in this case would be slightly modified and would take this jump into account. For example, if one considers Table 3, rather than the 49-tooth sprocket which gives three successive ratios of 0.83, 0.72, and 0.63, one could place a 38-tooth sprocket that provides on the ratio 1/1 of the gear box a transmission ratio of 0.82 and a variation of 14% in relation to the preceding ratio. This 38-tooth sprocket would be provided to be used only with the ratio 1/1 of the box. Starting from the preceding position, there would be only one change of sprocket to achieve this position. There would be no change in the ratio of the secondary sub-assembly. This makes it possible to adjust the extent of the range of ratios, and also to adjust the transmission ratio to the desired value.

According to another example, for the table related to the extensible chain wheel, the passage on the 15-tooth sprocket yields a transmission ratio of 3.20 with a variation of 5.77% in relation to the preceding ratio. To adjust it to a value closer to 9%, one could pass on a 14-tooth sprocket by remaining on the 44-tooth position of the chain wheel and by not modifying the state of the chain wheel for this sprocket. The variation would then be 7.69%. One could then pass on a 16-tooth sprocket with a change in the state of the chain wheel and continue with a change in the state of the chain wheel, and so on by reusing the geometric series for the numbers of sprocket teeth on the basis of this 16-tooth sprocket.

For the three-ratio box, one could in the same way occasionally use only a single ratio or two ratios between two successive sprockets.

Finally, according to the invention, it suffices that the secondary sub-assembly introduce at least one intermediate ratio for only a portion of the sprockets.

The present description is provided for guidance only, and other embodiments of the invention could be adopted without leaving the scope thereof.

The instant application is based upon French Patent Application No. 00 04791, filed Apr. 11, 2000, the disclosure of which is hereby incorporated by reference thereto in its entirety, and the priority of which is hereby claimed under 35 U.S.C. §119.

What is claimed is:

1. A transmission system for a bicycle having a frame, a front wheel, a rear wheel with a hub and a hub shaft, and a drive bottom bracket assembly with a crank axle, said transmission system including a transmission chain, a primary transmission sub-assembly having a set of sprockets provided to be mounted on the rear wheel, whose number of teeth varies generally, for at least a portion of them, along a geometric progression with a ratio of the number of teeth of two adjacent sprockets greater than or equal to a value n greater than 1, with a rear derailleur provided for transferring the chain from a given sprocket to an adjacent sprocket, a secondary transmission sub-assembly associated with the bottom bracket assembly having at least two drive output ratios, whose ratio of the highest drive speed to the lowest drive speed is equal to a value R comprised between 1 and n, wherein the ratio R is close to 1 and wherein the secondary transmission sub-assembly includes a single crown for driving the chain and carries out a change in ratio while maintaining the chain in the same plane.

2. A system according to claim 1, wherein the secondary transmission sub-assembly is formed by a front chain wheel for driving the chain whose diameter varies according to two or three states.

3. A system according to claim 2, wherein the chain wheel has a crown formed by four sectors radially extensible according to two or three positions.

4. A system according to claim 1, wherein the secondary transmission sub-assembly includes a single crown and a gear box having an input and an output, and having two or three output ratios, which is provided to receive at the input the crank axle, and to drive at the output the crown for driving the chain.

5. A system according to claim 1, wherein the secondary transmission sub-assembly includes a gear box having an input and an output, and having two or three output ratios, which is provided to receive at the input the hub shaft of the rear wheel driven by the primary transmission sub-assembly, and to drive the wheel at the output.

6. A system according to claim 4, wherein at least one of the output speeds of the gear box is equal to the input speed.

7. A system according to claim 5, wherein at least one of the output speeds of the gear box is equal to the input speed.

8. A device for controlling a transmission system defined in claim 1, said device including a centralized guiding device connected to the derailleur associated with the primary sub-assembly and with the secondary sub-assembly provided to alternatively address two types of controls, a first control for changing ratios addressed to the secondary sub-assembly in the desired direction for the variation in the speed ratio, and a second control for changing ratios addressed simultaneously to the primary sub-assembly in the desired variation direction and to the secondary sub-assembly in the variation direction opposite the desired variation direction, wherein the rear derailleur is guided by an electric control, wherein the second sub-assembly is guided by an electric control, and wherein the centralized guiding device includes an electronic device for managing the controls addressed to the rear derailleur and to the secondary transmission sub-assembly, respectively.

9. A bicycle comprising:

a frame, a front wheel, a rear wheel with a hub and a hub shaft, a drive bottom bracket assembly with a crank axle, including a transmission chain, a transmission system having a primary transmission sub-assembly having a set of sprockets provided to be mounted on the rear wheel, whose number of teeth varies generally, for at least a portion of them, along a geometric progression with a ratio of the number of teeth of two adjacent sprockets greater than or equal to a value n greater than 1, with a rear derailleur provided for transferring the chain from a given sprocket to an adjacent sprocket, a secondary transmission sub-assembly associated with the bottom bracket assembly having at least two drive output ratios, whose ratio of the highest drive speed to the lowest drive speed is equal to a value R comprised between 1 and n, wherein the ratio R is close to 1, and wherein the secondary transmission sub-assembly includes a single crown for driving the chain and carries out a change in ratio by maintaining the chain in the same plane.

10. A bicycle comprising:

a frame, a front wheel, a rear wheel with a hub and a hub shaft, a drive bottom bracket assembly with a crank axle, including a transmission chain, and a transmission system;

said transmission system comprising:

a primary transmission sub-assembly having a set of sprockets provided to be mounted on the rear wheel, whose number of teeth varies generally, for at least a portion of them, along a geometric progression with a ratio of the number of teeth of two adjacent sprockets greater than or equal to a value n greater than 1, with a rear derailleur provided for transferring the chain from a given sprocket to an adjacent sprocket; and a secondary transmission sub-assembly associated with the bottom bracket assembly having at least two drive output ratios, whose ratio of the highest drive speed to the lowest drive speed is equal to a value R comprised between 1 and n, wherein the ratio R is close to 1, and wherein the secondary transmission sub-assembly includes a single crown for driving the chain and carries out a change in ratio by maintaining the chain in the same plane; and a device for controlling the transmission system, said device comprising a centralized guiding device connected to the derailleur associated with the primary sub-assembly and with the secondary sub-assembly provided to alternatively address to the secondary sub-assembly a control for changing ratios in the desired direction for the variation in the speed ratio, and a control for changing ratios addressed to the primary sub-assembly in the desired variation direction combined with a control addressed to the secondary sub-assembly in the variation direction opposite the desired variation direction.

* * * * *